UNITED STATES PATENT OFFICE

MAX WYLER, OF BLACKLEY, MANCHESTER, ENGLAND, ASSIGNOR TO BRITISH DYE-STUFFS CORPORATION LIMITED, OF MANCHESTER, ENGLAND

PROCESS OF PURIFYING QUINOLINE AND QUINALDINE

No Drawing. Application filed May 5, 1927, Serial No. 189,176, and in Great Britain September 6, 1926.

In the usual Dobner-Miller synthesis of quinaldines it is very difficult to obtain a product of satisfactory purity, tedious methods of purification being necessary.

I have now discovered that pure quinaldines may be very simply isolated from the reaction mixture in the form of their zinc chloride double salts. These compounds, which have not previously been described, crystallize easily in a pure condition from an aqueous solution containing hydrochloric acid. They have the general formula:

$$[Q,HCl]_2,ZnCl_2,$$

where Q represents a molecule of quinaldine or of one of its substitution derivatives. When treated with alkali, such as soda, they are decomposed, with liberation of the free quinaldine, which may be distilled off in steam or may be separated as an oil from the aqueous sodium zincate solution. In either case the pure quinaldine distilling within a range of 3° C. is obtained without further treatment.

I have further made the very surprising discovery that when the quinaldine zinc chloride double salts are strongly heated, the hydrochloride of the base distils over between 250° and 300° C. in pure condition. Hydrochloride of quinoline itself may be similarly prepared by distilling it out of its double salt with zinc chloride.

My invention is illustrated but not limited by the following examples, in which the parts are by weight:

*Example 1: Quinaldine zinc chloride double salt and quinaldine base*

A mixture of 448 parts of aniline, 672 parts of 30 per cent hydrochloric acid and 672 parts of acetaldehyde is stirred for 3 days (cf. Dobner and Miller, Berichte, 1883, vol. 16, p. 2465; also German Patent 24317).

500 parts of zinc chloride are now added and the whole is heated to 300° C. After cooling to 200° C. the melt is poured into 2000 parts of water. 200 parts of hydrochloric acid are added and the mixture is allowed to crystallize. The double zinc chloride compound which separates is filtered off, washed with aqueous hydrochloric acid to remove any oil, and dried.

The quinaldine zinc chloride so obtained forms white crystals which melt about 240° C. In order to obtain quinaldine base from it, the double salt can be treated with sufficient aqueous caustic soda to precipitate some of the zinc as zinc hydroxide and the mixture distilled with steam. Alternatively, the double salt may be treated with sufficient caustic soda solution to redissolve the precipitated zinc hydroxide, and the oily quinaldine layer separated. In either case pure quinaldine, of boiling point 247–250° C., is obtained quite free from the by-products which usually accompany it.

The zinc chloride double salt of o-toluquinaldine, obtained in similar manner, melts at 273° C.; the base boils at 256° C. and on cooling sets to a solid of melting point 27° C. In the literature it is described only as an oil.

*Example 2: Quinaldine hydrochloride*

The quinaldine zinc chloride double salt, obtained as described in Example 1, is placed in a retort with an enamel or acid-resisting lining and heated in a suitable bath. The substance melts and presently an oil begins to distil over, which quickly solidifies to white crystals of pure quinaldine hydrochloride, melting point 211° C. The quinaldine itself may be obtained by treating the distilled hydrochloride with an alkali.

o-toluquinaldine hydrochloride, similarly obtained, melts at 227° C. When the double zinc chloride of quinoline itself is distilled under the same conditions, quinoline hydrochloride is obtained, melting at 134° C.

The separation of quinaldine in the form of double zinc chlorides may also be used for the isolation of these bases from mixtures other than those resulting from the Dobner-Miller reaction.

The double salt of the hydrochloride of o-toluquinaldine and zinc chloride probably has the structure

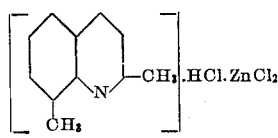

It melts at 273° C. On distillation it yields o-toluquinaldine hydrochloride with a melting point of 227° C.

What I claim and desire to secure by Letters Patent is:—

1. In the manufacture of pure quinaldines from crude reaction mixtures containing the same, the process which comprises converting the base in such a mixture into a double salt with zinc chloride by additions of zinc chloride and hydrochloric acid, and crystallizing out the resulting product.

2. In the manufacture of pure quinaldines from crude reaction mixtures containing the same, the process which comprises converting the base in such a mixture into a double salt with zinc chloride by additions of zinc chloride and hydrochloric acid, crystallizing out the resulting product and recovering the free base therefrom.

3. In the manufacture of pure quinaldines from crude reaction mixtures containing the same, the process which comprises converting the base in such a mixture into a double salt with zinc chloride by additions of zinc chloride and hydrochloric acid, crystallizing out the resulting product and recovering quinaldine hydrochloride from the crystallized product by distillation.

4. In the manufacture of pure quinaldine from crude reaction mixtures containing the same, the process which comprises converting the base in such a mixture into a double salt with zinc chloride by addition of zinc chloride and hydrochloric acid, crystallizing out the resulting product, recovering quinaldine hydrochloride from the crystallized product by distillation, and alkalizing the quinaldine hydrochloride to set free the quinaldine.

5. In the manufacture of pure quinaldines, the process which comprises adding zinc chloride and hydrochloric acid to crude reaction mixtures obtained in the manufacture of quinaldine by the Dobner-Miller process, and causing crystallization of a double salt of a quinaldine hydrochloride and zinc chloride.

6. In the manufacture of pure 2-methylquinoline from crude reaction mixtures containing the same, the process which comprises converting the base in such a mixture into a double salt with zinc chloride by additions of zinc chloride and hydrochloric acid, crystallizing out the resulting product and recovering the free base therefrom.

7. In the manufacture of pure 2-methylquinoline from crude reaction mixtures containing the same, the process which comprises converting the base in such a mixture into a double salt with zinc chloride by additions of zinc chloride and hydrochloric acid, crystallizing out the resulting product, recovering the free base therefrom by distilling 2-methylquinoline hydrochloride from the crystallized product and alkalizing the 2-methylquinoline hydrochloride to set free the 2-methylquinoline.

8. In the manufacture of pure quinoline and quinoline derivatives, the process which comprises converting a body having a quinoline group into a double salt of its hydrochloride with zinc chloride, distilling the quinoline derivative out of the double salt and converting the hydrochloride into free base.

9. The zinc chloride double salt of o-toluquinaldine which has the probable formula

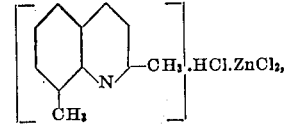

has a melting point at 273° C., and on distillation yields o-toluquinaldine hydrochloride, with a melting point of 227° C.

In testimony whereof I affix my signature.
MAX WYLER.